United States Patent
Hatakeyama

(10) Patent No.: US 11,811,353 B2
(45) Date of Patent: Nov. 7, 2023

(54) LOAD DRIVING DEVICE, REFRIGERATION CYCLE APPLICABLE APPARATUS, AND AIR CONDITIONER

(71) Applicant: Mitsubishi Electric Corporation, Tokyo (JP)

(72) Inventor: Kazunori Hatakeyama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 562 days.

(21) Appl. No.: 17/058,227

(22) PCT Filed: Aug. 8, 2018

(86) PCT No.: PCT/JP2018/029777
§ 371 (c)(1),
(2) Date: Nov. 24, 2020

(87) PCT Pub. No.: WO2020/031290
PCT Pub. Date: Feb. 13, 2020

(65) Prior Publication Data
US 2021/0159820 A1     May 27, 2021

(51) Int. Cl.
*H02P 5/74*     (2006.01)
*F24F 11/88*     (2018.01)

(52) U.S. Cl.
CPC .............. *H02P 5/74* (2013.01); *F24F 11/88* (2018.01); *H02P 2207/05* (2013.01)

(58) Field of Classification Search
CPC .... H02P 5/46; H02P 5/60; H02P 1/028; H02P 21/143; H02P 2207/05; H02P 2201/03; H02M 7/48
See application file for complete search history.

(56) References Cited

U.S. PATENT DOCUMENTS

2018/0091079 A1     3/2018 Kashima et al.
2018/0178654 A1*    6/2018 Nishimura .............. B60L 50/15

FOREIGN PATENT DOCUMENTS

JP     2013-240274 A     11/2013
JP     2014-140272 A      7/2014
(Continued)

OTHER PUBLICATIONS

International Search Report of the International Searching Authority dated Oct. 23, 2018 for the corresponding International application No. PCT/JP2018/029777 (and English translation).
(Continued)

*Primary Examiner* — Said Bouziane
(74) *Attorney, Agent, or Firm* — POSZ LAW GROUP, PLC

(57) ABSTRACT

A load driving device includes a smoothing capacitor, an inverter, and a control unit. The inverter includes two legs, each including upper and lower arm switching elements connected in series and converts direct-current power stored in the smoothing capacitor into alternating-current power. The control unit performs voltage drop prevention control for preventing the voltage across the smoothing capacitor from becoming a negative voltage. The control unit stops power running control on the load when the capacitor voltage is higher than the sum of a first voltage and a second voltage. The first voltage is a potential difference between a second terminal and a first terminal in the upper-arm. The second voltage is a potential difference between a second terminal and a first terminal in the lower-arm in the same leg as the leg of the upper-arm.

8 Claims, 13 Drawing Sheets

(56) References Cited

FOREIGN PATENT DOCUMENTS

| | | |
|---|---|---|
| JP | 2014-204617 A | 10/2014 |
| JP | 2018-007326 A | 1/2018 |
| JP | 2018-007327 A | 1/2018 |
| JP | 2018-007328 A | 1/2018 |
| WO | 2017/022084 A1 | 2/2017 |

OTHER PUBLICATIONS

Notification of Reason for Refusal dated Jun. 16, 2020 issued in corresponding JP application No. 2020-521386 (and English translation).

* cited by examiner

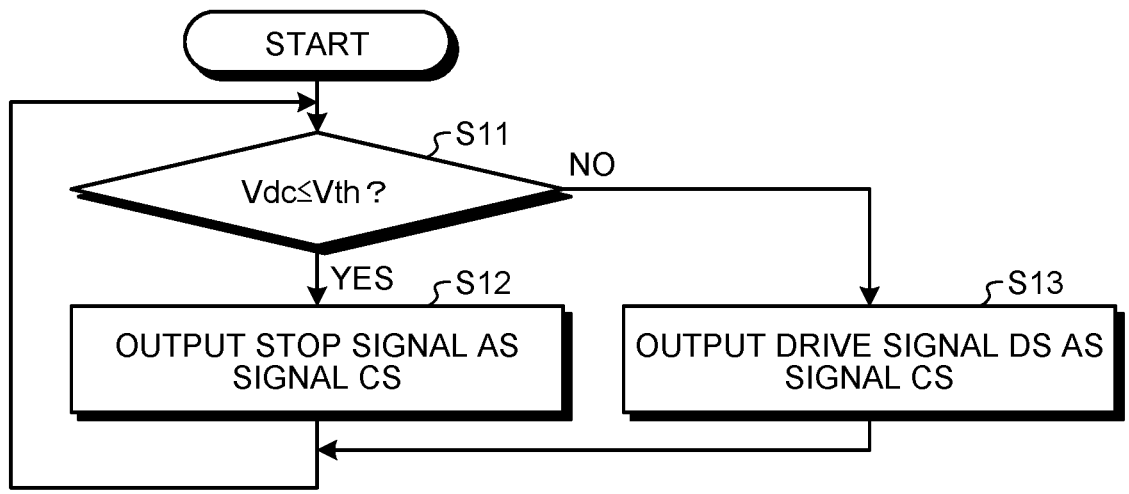
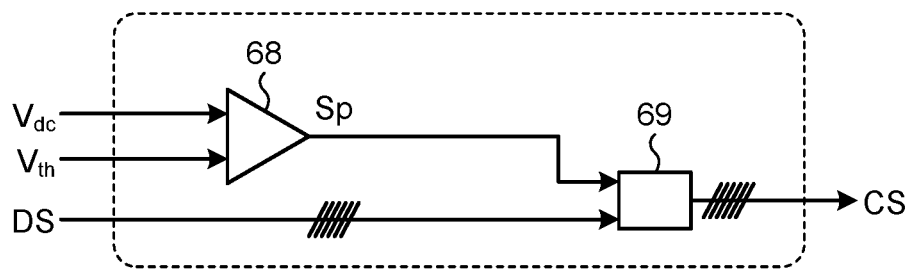

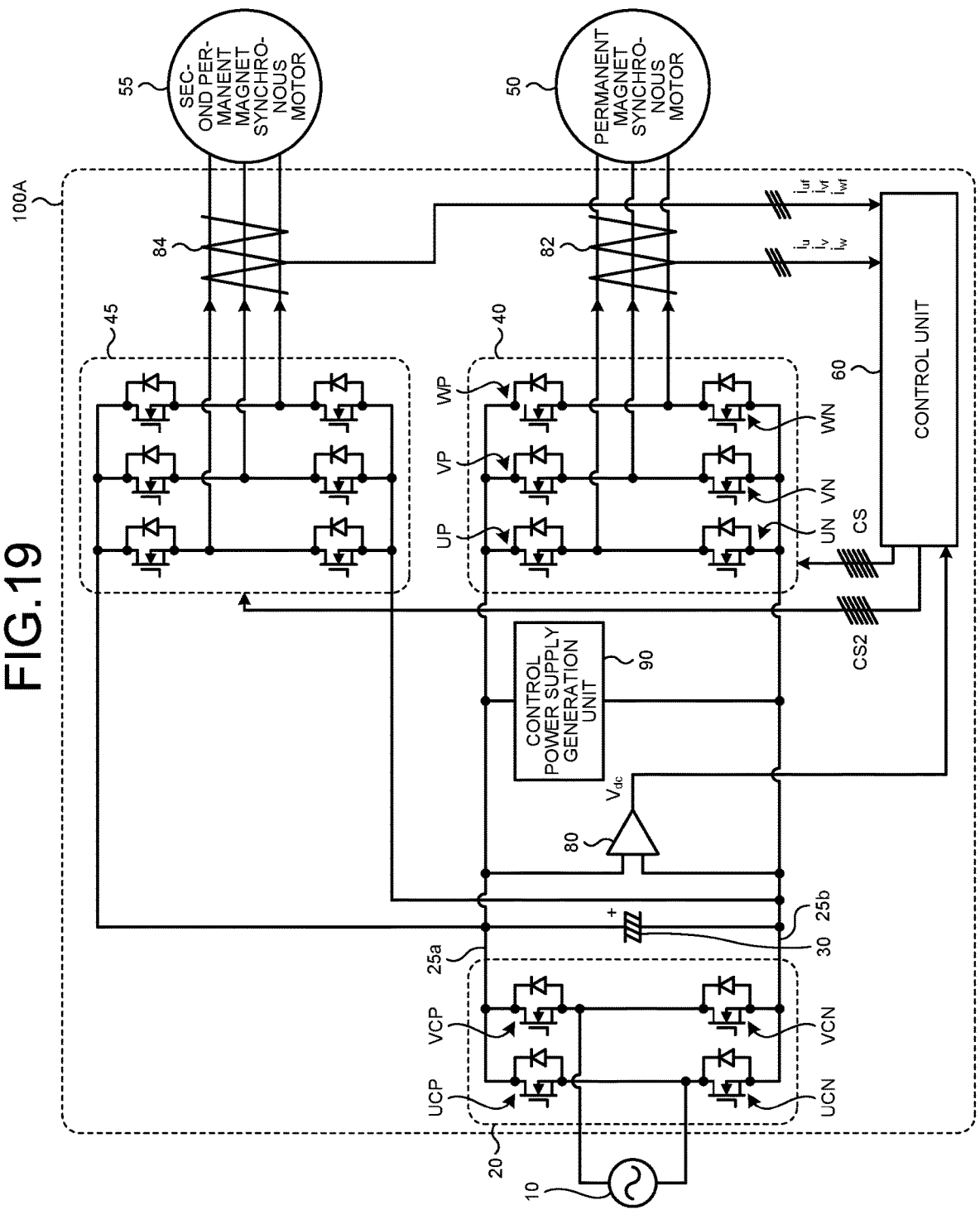

LOAD DRIVING DEVICE, REFRIGERATION CYCLE APPLICABLE APPARATUS, AND AIR CONDITIONER

CROSS REFERENCE TO RELATED APPLICATION

This application is a U.S. national stage application of International Application No. PCT/JP2018/029777 filed on Aug. 8, 2018, the contents of which are incorporated herein by reference.

TECHNICAL FIELD

The present invention relates to a load driving device for driving a load such as a motor, to a refrigeration cycle applicable apparatus including the load driving device, and to an air conditioner including the refrigeration cycle applicable apparatus.

BACKGROUND

A load driving device generally has a smoothing capacitor provided therein. Patent Literature 1 listed below describes that, during operation of the load driving device, the smoothing capacitor may be negatively charged, that is, the voltage across the smoothing capacitor may become a negative voltage.

A negative voltage of the smoothing capacitor may have an adverse effect such as a reduction in the life of the smoothing capacitor, which may in turn cause malfunction in the device coupled to the smoothing capacitor. Patent Literature 1 describes that a diode is connected in inverse parallel between both ends of the smoothing capacitor, and thereby the amount of application of the negative voltage of the smoothing capacitor is controlled not to exceed a value equivalent to a forward voltage drop across the diode.

CITATION LIST

Patent Literature

Patent Literature 1: Japanese Patent Application Laid-open No. 2013-240274

However, the technique in Patent Literature 1 requiring the diode to be coupled between both ends of the smoothing capacitor presents a problem in that the number of components is increased. In addition, the technique in Patent Literature 1 corresponds to a technique for controlling the amount of application of the negative voltage of the smoothing capacitor not to exceed the value equivalent to the forward voltage drop across the diode, in which the voltage across the smoothing capacitor is permitted to become some negative voltage. That is, the technique in Patent Literature 1 is not worth a technique for preventing the voltage across the smoothing capacitor from becoming a negative voltage.

The present invention has been made in view of the foregoing circumstances, and an object thereof is to provide a load driving device capable of preventing the voltage across the smoothing capacitor from becoming a negative voltage without setting up an additional component.

SUMMARY

In order to solve the above-mentioned problem and achieve the object, the present invention provides a load driving device supplying alternating-current power to a load and driving the load, the load driving device comprising: a smoothing capacitor; an inverter having at least two legs, each of the legs having an upper-arm switching element and a lower-arm switching element connected in series with each other, the inverter converting direct-current power stored in the smoothing capacitor into the alternating-current power; and a control unit controlling the inverter and performing voltage drop prevention control for preventing a voltage across the smoothing capacitor from becoming a negative voltage, Wherein the control unit stops power running control on the load in a state in which the voltage across the smoothing capacitor is higher than a sum of a first voltage and a second voltage, the first voltage being an electrical potential difference between a second terminal of the upper-arm switching element and a first terminal of the upper-arm switching element with reference to the first terminal of the upper-arm switching element, the second voltage being an electrical potential difference between a second terminal of the lower-arm switching element and a first terminal of the lower-arm switching element with reference to the first terminal of the lower-arm switching element in the same leg as a leg of the upper-arm switching element.

A load driving device according to the present invention provides an advantageous effect that the voltage across the smoothing capacitor can be prevented from becoming a negative voltage without setting up an additional component.

BRIEF DESCRIPTION OF DRAWINGS

FIG. 13 is a flowchart used for describing an operation performed in voltage drop prevention control in the first embodiment.

FIG. 14 is a block diagram illustrating a configuration example of a voltage drop prevention control unit in the first embodiment.

FIG. 19 is a circuit diagram illustrating a configuration example of a load driving device according to a second embodiment.

DETAILED DESCRIPTION

A load driving device, a refrigeration cycle applicable apparatus, and an air conditioner according to embodiments of the present invention will be described in detail below with reference to the accompanying drawings. Note that the following embodiments are not intended to limit the scope of the present invention.

First Embodiment

Figure 1:
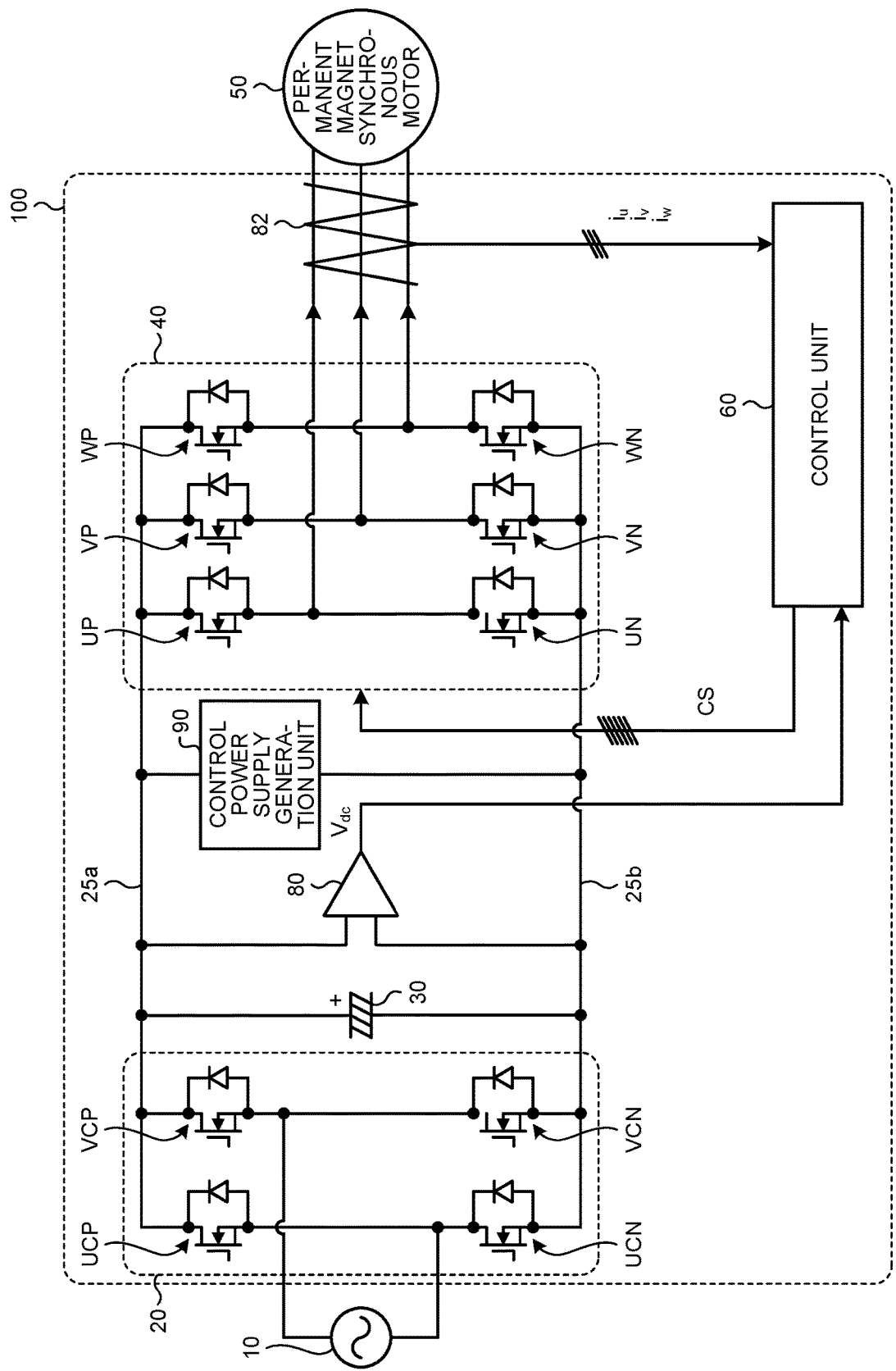
FIG. 1 is a circuit diagram illustrating a configuration example of a load driving device according to a first embodiment.
Figure 2:
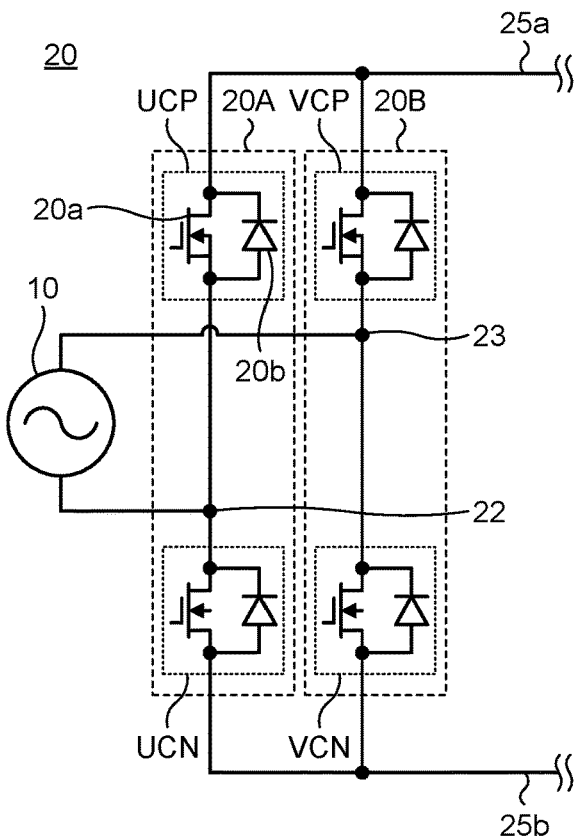
FIG. 2 is a partial enlarged view of a rectification unit illustrated in FIG. 1.
Figure 3:
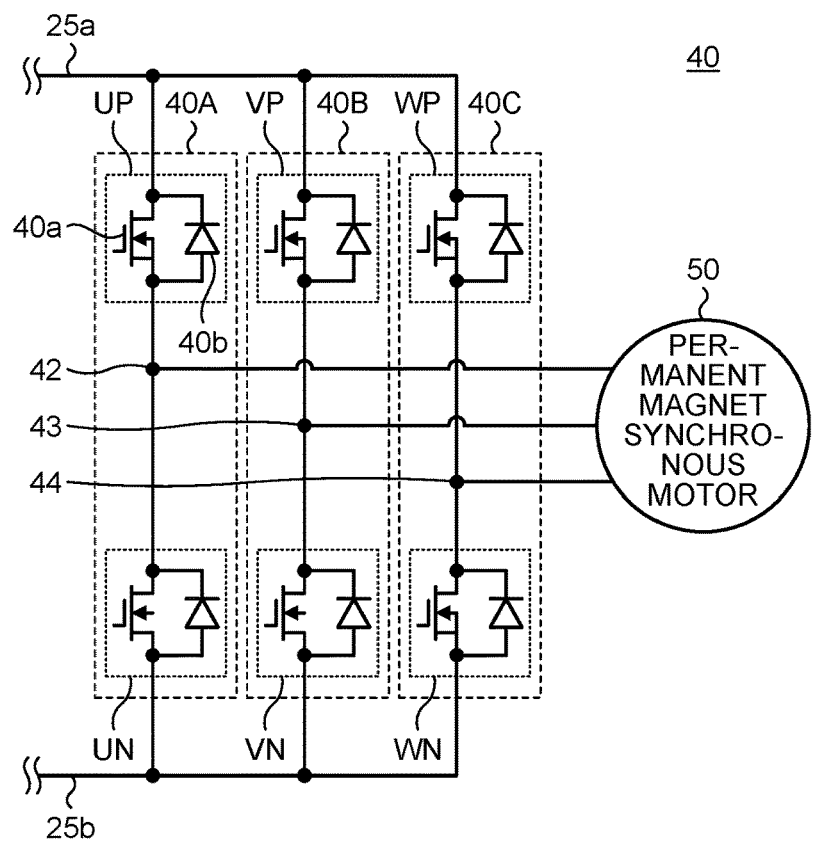
FIG. 3 is a partial enlarged view of an inverter illustrated in FIG. 1.

FIG. 1 is a circuit diagram illustrating a configuration example of a load driving device 100 according to a first embodiment. FIG. 2 is a partial enlarged view of a rectification unit 20 illustrated in FIG. 1. FIG. 3 is a partial enlarged view of an inverter 40 illustrated in FIG. 1.

The load driving device 100 according to the first embodiment is configured, as illustrated in FIG. 1, to temporarily convert an AC voltage outputted from an AC power supply 10 that is a single-phase power supply into a DC voltage, reconvert the DC voltage to an AC voltage in the load driving device 100, and drive a permanent magnet synchronous motor 50 that is an example of load. The permanent magnet synchronous motor 50 is applicable to a compressor motor equipped in a refrigeration cycle applicable apparatus.

The load driving device 100 includes, as illustrated in FIG. 1, the rectification unit 20, a smoothing capacitor 30, a voltage detector 80, a control power supply generation unit 90, the inverter 40, a control unit 60, and a current detector 82. The rectification unit 20 and the inverter 40 are electrically coupled to each other by DC bus lines 25a and 25b. The smoothing capacitor 30 and the control power supply generation unit 90 are each coupled between the DC bus line 25a having a higher electric potential and the DC bus line 25b having a lower electric potential.

The rectification unit 20 rectifies the AC voltage outputted from the AC power supply 10 to convert the AC voltage into a DC voltage. The AC voltage and the DC voltage may also be reworded to be "AC power" and "DC power", respectively.

The rectification unit 20 includes, as illustrated in FIG. 2, a leg 20A having an upper-arm element UCP and a lower-arm element UCN coupled in series with each other, and a leg 20B having an upper-arm element VCP and a lower-arm element VCN coupled in series with each other. The leg 20A and the leg 20B are coupled in parallel with each other.

FIG. 2 illustrates, by way of example, a case in which the upper-arm elements UCP and VCP and the lower-arm elements UCN and VCN are each a metal-oxide-semiconductor field-effect transistor (MOSFET). The upper-arm element UCP includes a transistor 20a and a diode 20b connected in inverse parallel with the transistor 20a. The other ones, i.e., the upper-arm element VCP and the lower-arm elements UCN and VCN, are each configured similarly to the upper-arm element UCP. The term "inverse parallel" as used here means that a first terminal corresponding to a source of a MOSFET is connected with an anode of a diode, while a second terminal corresponding to a drain of the MOSFET connected with a cathode of the diode.

In the case in which the transistors 20a of the upper-arm elements UCP and VCP and the lower-arm elements UCN and VCN are each a MOSFET, the diode 20b connected in inverse parallel with the transistor 20a can be implemented using a parasitic diode internally owned by the MOSFET itself. A parasitic diode is also called "body diode". Use of a parasitic diode eliminates the need for a separate diode and can thus provide a reduction in the number of components, thereby leading to a cost reduction.

In addition, in the case in which the transistors 20a of the upper-arm elements UCP and VCP and the lower-arm elements UCN and VCN are each a MOSFET, at least one of the upper-arm elements UCP and VCP and the lower-arm elements UCN and VCN may be formed of a wide bandgap semiconductor such as silicon carbide, a gallium-nitride-based material, or diamond. Examples of wide bandgap semiconductor include silicon carbide (SiC), gallium nitride (GaN), gallium oxide ($Ga_2O_3$), diamond, and more.

A wide bandgap semiconductor generally has a higher voltage resistance and a higher heat resistance than a silicon semiconductor. For this reason, use of a MOSFET formed of a wide bandgap semiconductor in at least one of the upper-arm elements UCP and VCP and the lower-arm elements UCN and VCN enables benefits of high voltage resistance and high heat resistance to be received.

The upper-arm elements UCP and VCP and the lower-arm elements UCN and VCN may also each be configured using, for example, an insulated gate bipolar transistor (IGBT) instead of a MOSFET. Note that any parasitic diode is not formed in an IGBT, and thus when an IGBT is used, the diode 20b connected in inverse parallel therewith is essential.

In addition, although the upper-arm elements UCP and VCP and the lower-arm elements UCN and VCN in FIG. 2 are configured by equal types of elements, respectively, the embodiment is not limited to this configuration. For example, the two legs 20A and 20B may each use a switching element as the upper-arm element, and a diode as the lower-arm element. Alternatively, of the two legs 20A and 20B, any one may use switching elements as the upper-arm element and the lower-arm element, and the other one may use diodes as the upper-arm element and the lower-arm element.

The upper-arm element UCP and the lower-arm element UCN are connected to each other at a connection point 22, which is connected to one end of the AC power supply 10. The upper-arm element VCP and the lower-arm element VCN are connected to each other at a connection point 23, which is connected to another end of the AC power supply 10. In the rectification unit 20, the connection points 22 and 23 each form an AC terminal.

FIGS. 1 and 2 illustrate a configuration including two legs each having the upper-arm element and the lower-arm element connected in series with each other. This configuration is adapted for the AC power supply 10 that is a single-phase power supply. If the AC power supply 10 is a three-phase power supply, the rectification unit 20 would be configured to be adapted to the three-phase power supply accordingly. Specifically, the configuration is supposed to have three legs each having an upper-arm element and a lower-arm element connected in series with each other. Note that regardless of whether the AC power supply 10 is a single-phase power supply or a three-phase power supply, one leg may be configured to have multiple pairs of upper-arm and lower-arm elements.

Referring back to FIG. 1, the description of the load driving device 100 will be continued. The DC power generated by the conversion in the rectification unit 20 is stored in the smoothing capacitor 30.

One example of the smoothing capacitor 30 is an aluminum electrolytic capacitor. An aluminum electrolytic capacitor has a high capacitance per volume, thereby enabling the component size to be reduced relative to the electricity storage capacitance. For this reason, an aluminum electrolytic capacitor is suitable for size reduction of the device. Note that a high capacitance may cause a high harmonic current to flow into the AC power supply 10. If a harmonic current presents some problem, a film capacitor may be used instead of an aluminum electrolytic capacitor. A film capacitor generally has a longer life than an aluminum electrolytic capacitor. Moreover, for the purpose of further reduction of the harmonic current and improvement in power factor, a reactor may be interposed between the AC power supply 10 and the smoothing capacitor 30.

The voltage between the DC bus lines 25a and 25b is applied to the control power supply generation unit 90. The voltage between the DC bus lines 25a and 25b will hereinafter be referred to as "bus voltage" case by case. The control power supply generation unit 90 steps down the bus voltage and generates a power supply voltage for operating the control unit 60, the voltage detector 80, and so on.

The bus voltage is applied to the inverter 40. The inverter 40 converts the DC power stored in the smoothing capacitor 30 into AC power through the DC bus lines 25a and 25b and supplies the AC power generated by the conversion to the permanent magnet synchronous motor 50 that is a load.

The inverter 40 includes, as illustrated in FIG. 3, a leg 40A having an upper-arm switching element UP and a lower-arm switching element UN connected in series with each other, a leg 40B having an upper-arm switching element VP and a lower-arm switching element VN connected in series with each other, and a leg 40C having an upper-arm switching element WP and a lower-arm switching element WN connected in series with each other. The leg 40A, the leg 40B, and the leg 40C are connected in parallel with one another.

FIG. 3 illustrates, by way of example, a case in which the upper-arm switching elements UP, VP, and WP and the lower-arm switching elements UN, VN, and WN are each a MOSFET. The upper-arm switching element UP includes a transistor 40a and a diode 40b coupled in inverse parallel with the transistor 40a. The other ones, i.e., the upper-arm switching elements VP and WP, and the lower-arm switching elements UN, VN, and WN are each configured similarly to the upper-arm switching element UP. The term "inverse parallel" as used here means that, similarly to the case of the rectification unit 20, a first terminal corresponding to a source of a MOSFET is connected with an anode of a diode, while a second terminal corresponding to a drain of the MOSFET is coupled with a cathode of the diode.

Note that FIG. 3 illustrates a configuration having three legs each having the upper-arm switching element and the lower-arm switching element coupled in series with each other, but the embodiment is not limited to this configuration. The number of legs may be four or more. In addition, the circuit configuration of FIGS. 1 and 3 is adapted for the three-phase permanent magnet synchronous motor 50, which is an example of the load. In a case in which the load is a single-phase motor, the inverter 40 is supposed to be configured to be adapted to the single-phase motor accordingly. Specifically, the configuration will include two legs each having an upper-arm switching element and a lower-arm switching element coupled in series with each other. Note that regardless of whether the load is a single-phase motor or a three-phase motor, one leg may be configured using multiple pairs of upper-arm and lower-arm switching elements.

In the case in which the transistors 40a of the upper-arm switching elements UP, VP, and WP and the lower-arm switching elements UN, VN, and WN are each a MOSFET, the diode 40b coupled in inverse parallel with the transistor 40a can be implemented using a parasitic diode internally owned by the MOSFET itself. Use of the parasitic diode eliminates the need for a separate diode, so that the number of components can be reduced thereby to lead to a cost reduction.

In addition, in the case in which the transistors 40a of the upper-arm switching elements UP, VP, and WP and the lower-arm switching elements UN, VN, and WN are each a MOSFET, at least one of the upper-arm switching elements UP, VP, and WP and the lower-arm switching elements UN, VN, and WN may be made from a wide bandgap semiconductor such as silicon carbide, a gallium-nitride-based material, or diamond.

A wide bandgap semiconductor generally has higher voltage resistance and higher heat resistance than a silicon semiconductor. For this reason, use of a MOSFET formed of a wide bandgap semiconductor in at least one of the upper-arm switching elements UP, VP, and WP and the lower-arm switching elements UN, VN, and WN enables benefits of high voltage resistance and high heat resistance to be received.

The upper-arm switching element UP and the lower-arm switching element UN are connected to each other at a connection point 42, and the connection point 42 is connected to a first phase (e.g., U phase) line of the permanent magnet synchronous motor 50. The upper-arm switching element VP and the lower-arm switching element VN are connected to each other at a connection point 43, and the connection point 43 is connected to a second phase (e.g., V phase) line of the permanent magnet synchronous motor 50. The upper-arm switching element WP and the lower-arm switching element WN are connected to each other at a connection point 44, and the connection point 44 is connected to a third phase (e.g., W phase) line of the permanent magnet synchronous motor 50. In the inverter 40, the connection points 42, 43, and 44 each form an AC terminal.

Referring back to FIG. 1, the description of the load driving device 100 will be continued. The permanent magnet synchronous motor 50 is driven by electric power supplied from the inverter 40. The permanent magnet synchronous motor 50 is one example of load. Any motor configured to generate regenerative electric power can be the load described in the present embodiment.

Figure 4:
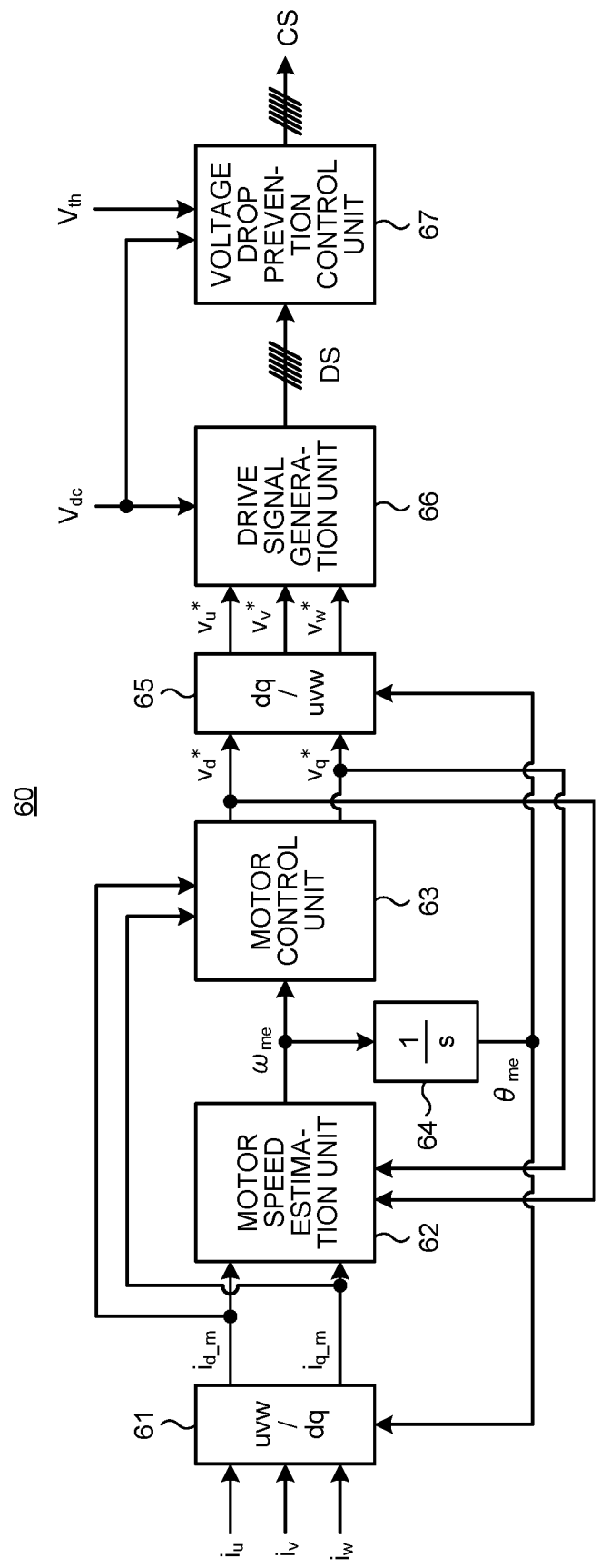
FIG. 4 is a block diagram illustrating a detailed configuration of a control unit illustrated in FIG. 1.

A configuration and general operation of a control system primarily including the control unit 60 configured to control the inverter 40 will next be described with reference to FIGS. 1 and 4. FIG. 4 is a block diagram illustrating a detailed configuration of the control unit 60 illustrated in FIG. 1.

The voltage detector 80 detects the bus voltage. In the configuration of FIG. 1, the bus voltage is an input voltage to the inverter 40 and also corresponds to the voltage across the smoothing capacitor 30. The voltage across the smoothing capacitor 30 will hereinafter be referred to as "capacitor voltage" case by case. The voltage detector 80 detects the capacitor voltage, and the detected value $V_{dc}$ of the detected capacitor voltage is inputted to the control unit 60.

The current detector 82 detects an electric phase current flowing in each of the phase lines between the inverter 40 and the permanent magnet synchronous motor 50. This phase current will hereinafter be referred to as "motor current" case by case. The current detector 82 detects a motor current, and detected values $i_u$, $i_v$, and $i_w$ of the detected motor current are inputted to the control unit 60.

The control unit 60 generates signals for operating or stopping the operation of the inverter 40 based on the detected value $V_{dc}$ of the capacitor voltage and the detected values $i_u$, $i_v$, and $i_w$ of the motor current. FIG. 1 indicates these signals as "CS". Specifically, the signals CS are each a pulse width modulation (PWM) signal for performing power running control on the permanent magnet synchronous motor 50, or a stop signal for stopping rotation of the permanent magnet synchronous motor 50.

The term "power running" as used herein refers to a state in which power is being supplied from the inverter 40 to the permanent magnet synchronous motor 50, and the term "power running control" as used herein refers to control to place the permanent magnet synchronous motor 50 into a power running mode. For example, during acceleration of the motor, the rotational speed and the torque have the same sign, by which the motor is in a power running mode. An antonym of the term "power running" is "regeneration". The term regeneration as used herein refers to a state in which rotational energy held in the permanent magnet synchronous motor 50 is flowing into the inverter 40. For example, during deceleration of the motor, the rotational speed and the torque have opposite signs, by which the motor is in a regeneration mode.

Note that in FIG. 1, a configuration is adapted, in which the current detector 82 detects the phase currents flowing between the inverter 40 and the permanent magnet synchronous motor 50, but the embodiment is not limited to this configuration. It is possible to adopt a configuration such that resistors are provided between the lower-arm switching elements of the inverter 40 and the DC bus line 25b on the lower potential side, and the currents are detected by measurement of the voltage across each of the resistors.

The control unit 60 includes, as illustrated in FIG. 4, a first coordinate conversion unit 61, a motor speed estimation unit 62, a motor control unit 63, an integrator 64, a second coordinate conversion unit 65, a drive signal generation unit 66, and a voltage drop prevention control unit 67.

The first coordinate conversion unit 61 calculates d-q axis currents $i_{d\_m}$ and $i_{q\_m}$ based on the detected values $i_u$, $i_v$, and $i_w$ of the motor current and an estimated magnetic pole position value $\theta_{me}$ generated by the integrator 64 described later. Specifically, the first coordinate conversion unit 61 converts the detected values $i_u$, $i_v$, and $i_w$ that are current values represented in the UVW coordinate system into current values represented in the d-q coordinate system using the estimated magnetic pole position value $\theta_{me}$. The current values obtained by the conversion are outputted to the motor speed estimation unit 62 and to the motor control unit 63, as the d-q axis currents $i_{d\_m}$ and $i_{q\_m}$.

The motor speed estimation unit 62 estimates an estimated rotational speed value $\omega_{me}$ of the permanent magnet synchronous motor 50 based on the d-q axis currents $i_{d\_m}$ and $i_{q\_m}$ and d-q axis voltage command values $v_d^*$ and $v_q^*$. The d-q axis voltage command values $v_d^*$ and $v_q^*$ are voltage command values on the d-q axes, generated by the motor control unit 63 described later.

The integrator 64 calculates the estimated magnetic pole position value $\theta_{me}$ of the permanent magnet synchronous motor 50 based on the estimated rotational speed value $\omega_{me}$. The estimated magnetic pole position value $\theta_{me}$ is calculated by integrating the estimated rotational speed value $\omega_{me}$ in the integrator 64.

The estimated rotational speed value $\omega_{me}$ and the estimated magnetic pole position value $\theta_{me}$ can be estimated using a publicly known technique. For example, details thereof is described in Japanese Patent No. 4672236, and detailed description thereof will therefore be omitted herein. Note that although the estimated rotational speed value $\omega_{me}$ and the estimated magnetic pole position value $\theta_{me}$ are estimated in the control unit 60 in the present embodiment, any technique may be used as long as it can estimate or detect the rotational speed and the magnetic pole position. In addition, although the estimated rotational speed value $\omega_{me}$ and the estimated magnetic pole position value $\theta_{me}$ are estimated using the d-q axis currents $i_{d\_m}$ and $i_{q\_m}$ and the d-q axis voltage command values $v_d^*$ and $v_q^*$ in the present embodiment, information described herein may be omitted or information not described herein may be used as long as the estimated rotational speed value $\omega_{me}$ and the estimated magnetic pole position value $\theta_{me}$ can be estimated.

The motor control unit 63 calculates the d-q axis voltage command values $v_d^*$ and $v_q^*$ based on the d-q axis currents $i_{d\_m}$ and $i_{q\_m}$ and the estimated rotational speed value $\omega_{me}$. Then, the second coordinate conversion unit 65 calculates voltage command values $v_u^*$, $v_v^*$, and $v_w^*$ based on the d-q axis voltage command values $v_d^*$ and $v_q^*$ and the estimated magnetic pole position value $\theta_{me}$. Specifically, the second coordinate conversion unit 65 converts the d-q axis voltage command values $v_d^*$ and $v_q^*$ that are voltage command values on the d-q axes into the voltage command values $v_u^*$, $v_v^*$, and $v_w^*$ represented in the UVW coordinate system using the estimated magnetic pole position value $\theta_{me}$, and outputs the voltage command values $v_u^*$, $v_v^*$, and $v_w^*$ obtained by the conversion to the drive signal generation unit 66.

The drive signal generation unit 66 generates a drive signal DS based on the voltage command values $v_u^*$, $v_v^*$, and $v_w^*$ and the detected value $V_{dc}$ of the capacitor voltage. The drive signals DS are signals for driving the switching elements of the inverter 40. The inverter 40 is controlled by the drive signals DS and applies a desired voltage to the permanent magnet synchronous motor 50. Note that what is widely used for the voltage command values $v_u^*$, $v_v^*$, and $v_w^*$ is generally a waveform on which some sine wave or third-order harmonic is superimposed, but any technique may be used as long as it can drive the permanent magnet synchronous motor 50.

The drive signal DS is inputted to the voltage drop prevention control unit 67 together with the detected value $V_{dc}$ of the capacitor voltage and a threshold voltage $V_{th}$. The voltage drop prevention control unit 67 performs voltage drop prevention control for preventing the voltage across the smoothing capacitor 30 from becoming a negative voltage. When the voltage drop prevention control not to be performed, the voltage drop prevention control unit 67 outputs the drive signal DS as the signal CS as it is. Alternatively, when the voltage drop prevention control is to be performed, the stop signal described above is generated based on the detected value $V_{dc}$ of the capacitor voltage and the threshold voltage $V_{th}$. That is, in the voltage drop prevention control unit 67, the signal CS corresponds to the stop signal when the voltage drop prevention control is to be carried out, and the stop signal causes the switching elements of the inverter 40 to be driven. Note that the voltage drop prevention control will be described in detail later.

Figure 5:
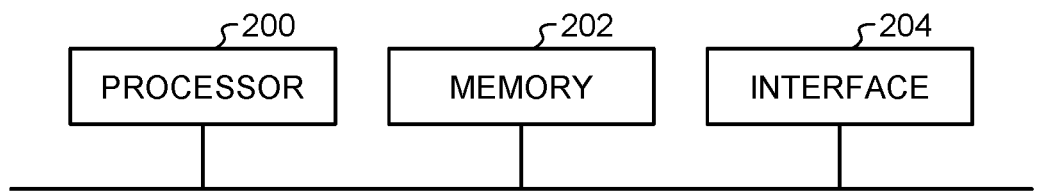
FIG. 5 is a block diagram illustrating an example of a hardware configuration by which the functionality of a control system of the control unit in the first embodiment is implemented.
Figure 6:
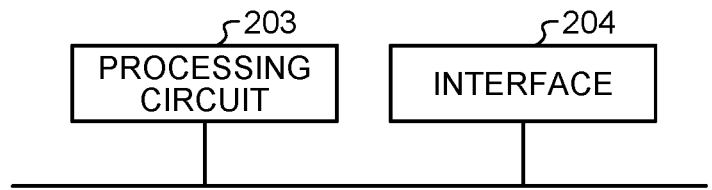
FIG. 6 is a block diagram illustrating another example of a hardware configuration by which the functionality of a control system of the control unit in the first embodiment is implemented.

FIG. 5 is a block diagram illustrating an example of a hardware configuration by which the functionality of the control system of the control unit 60 in the first embodiment is implemented. In addition, FIG. 6 is a block diagram illustrating another example of a hardware configuration by which the functionality of the control system of the control unit 60 in the first embodiment is implemented.

To implement all or some of the functionalities of the control system of the control unit 60 in the first embodiment, it is possible to adopt a configuration, as illustrated in FIG. 5, including a processor 200 that performs computation, a memory 202 in which a program or programs to be read by the processor 200 are stored, and an interface 204 that inputs and outputs a signal.

The processor 200 may be computing means such as a computing device, a microprocessor, a microcomputer, a central processing unit (CPU), or a digital signal processor (DSP). In addition, the memory 202 can be, for example, a non-volatile or volatile semiconductor memory such as a random access memory (RAM), a read-only memory (ROM), a flash memory, an erasable programmable ROM (EPROM), or an electrically EPROM (EEPROM) (registered trademark); a magnetic disk, a flexible disk, an optical disk, a compact disc, a MiniDisc, or a digital versatile disc (DVD).

The memory 202 has stored therein a program or programs for executing all or some of the functionalities of the control system in the control unit 60. The processor 200 transfers and receives necessary information via the interface 204, and executes a program stored in the memory 202 thereby to control the inverter 40.

In addition, the processor 200 and the memory 202 illustrated in FIG. 5 may be replaced with a processing circuit 203 as illustrated in FIG. 6. The processing circuit 203 corresponds to single circuit, a composite circuit, an application specific integrated circuit (ASIC), a field-programmable gate array (FPGA), or any combination thereof. The processing circuit 203 may be configured using an electric circuit element or the like, such as an analog circuit or a digital circuit instead.

An operation of the load driving device 100 when the supply of power to the load driving device 100 is cut off because of power outage of the AC power supply 10 or the like will next be described. An interruption of the supply of power to the load driving device 100 is hereinafter referred to as "loss of power" or the like. In addition, an occasion where the supply of power to the load driving device 100 is resumed after the loss of power is referred to as "recovery of power" or the like.

Figure 7:
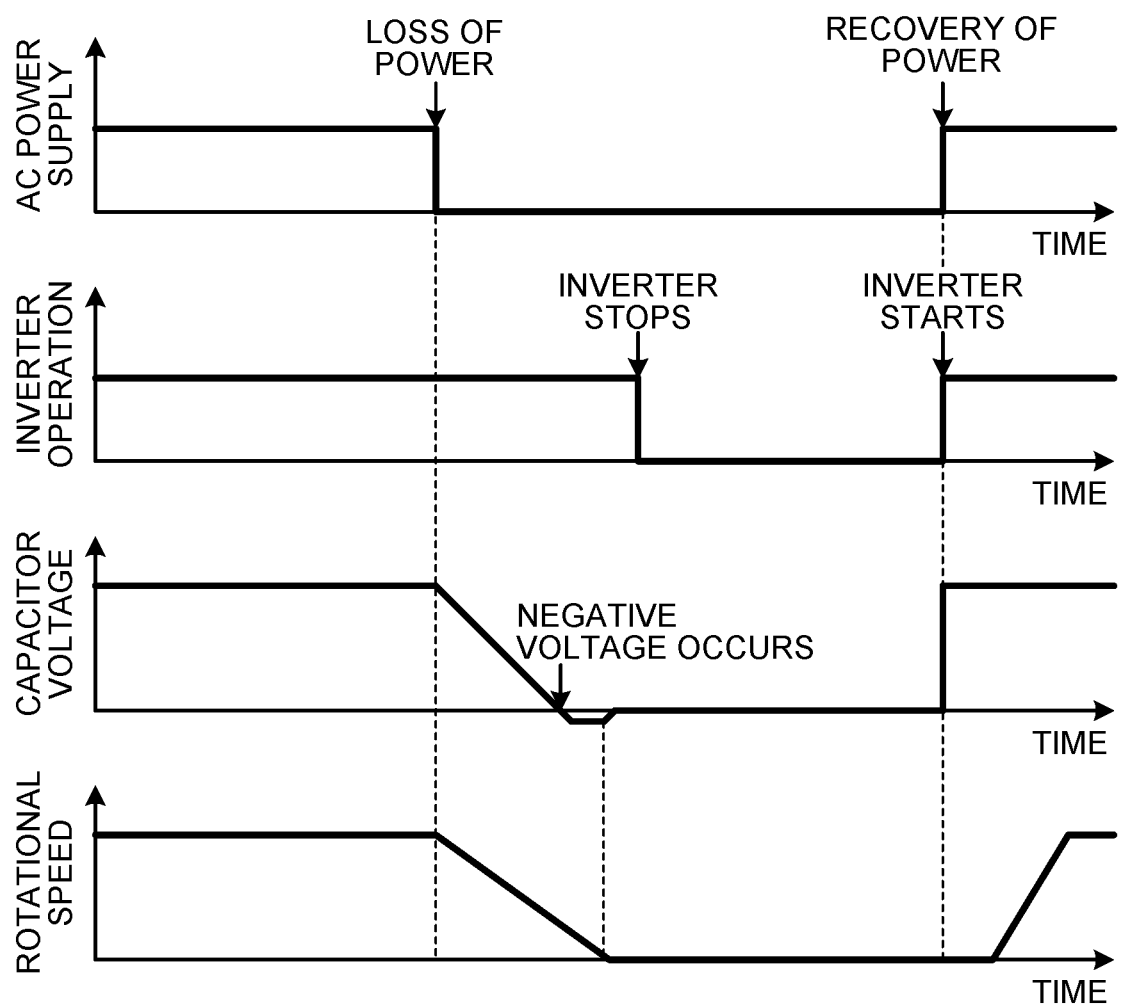
FIG. 7 is a time chart used for describing an operation at the time of loss of power in the load driving device of FIG. 1.

FIG. 7 is a time chart used for describing an operation at the time of loss of power in the load driving device 100 of FIG. 1. FIG. 7 illustrates a situation in which the inverter 40 continues its operation even if a capacitor voltage is dropped at the time of loss of power. A drop of the capacitor voltage causes the voltage applicable to the permanent magnet synchronous motor 50 to be lowered, thereby causing the rotational speed of the permanent magnet synchronous motor 50 to be decreased. Meanwhile, when the inverter 40 continues its operation until the capacitor voltage becomes near zero in a state where the permanent magnet synchronous motor 50 is rotating even during a decrease in the rotational speed of the permanent magnet synchronous motor 50, a phenomenon occurs in which, as illustrated, the capacitor voltage turns into a negative voltage. The condition of a negative voltage of the capacitor voltage disappears in stoppage of the operation of the inverter 40, and recovery of power of the AC power supply 10 causes the inverter 40 to be started up, and causes the permanent magnet synchronous motor 50 to rotate again.

Figure 8:
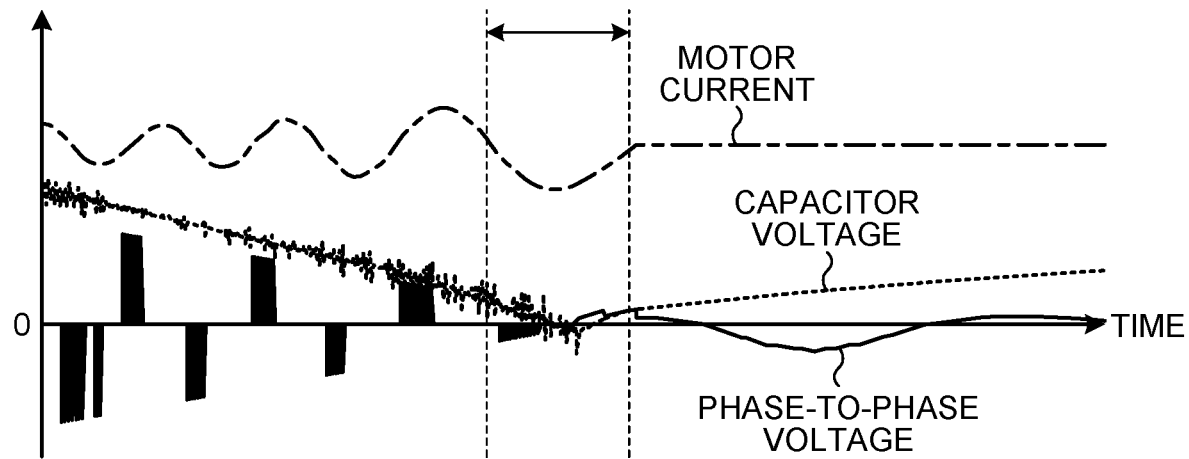
FIG. 8 is a graph illustrating various kinds of waveform examples when the operation illustrated in FIG. 7 is carried out.
Figure 9:
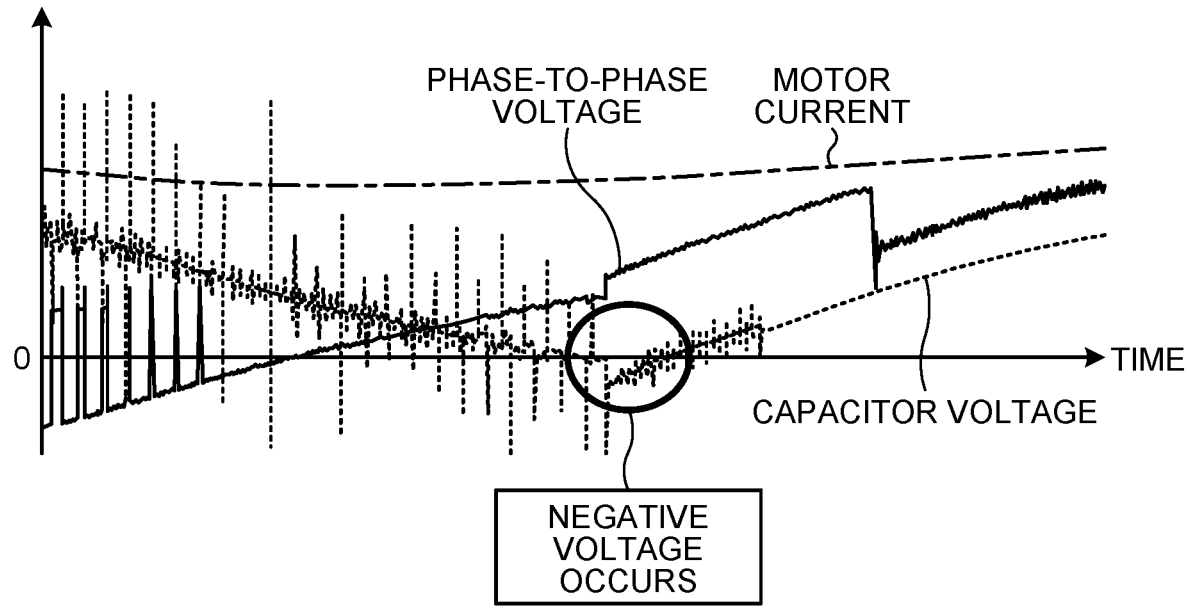
FIG. 9 is a partial enlarged view of a section indicated by a double-headed arrow in FIG. 8.

FIG. 8 is a diagram illustrating various kinds of waveform examples when the operation illustrated in FIG. 7 is carried out. FIG. 9 is a partial enlarged view of a section indicated by a double-headed arrow in FIG. 8. In FIGS. 8 and 9, a broken line represents the capacitor voltage, a dashed-and-dotted line represents the motor current flowing in the first phase (e.g., U phase) line, and a solid line represents a phase-to-phase voltage, i.e., a voltage between the first phase (e.g., U phase) line and the second phase (e.g., V phase) line. In FIG. 9, a phenomenon is occurring in which the capacitor voltage turns into a negative voltage as illustrated in a portion encircled by an ellipse.

Figure 10:
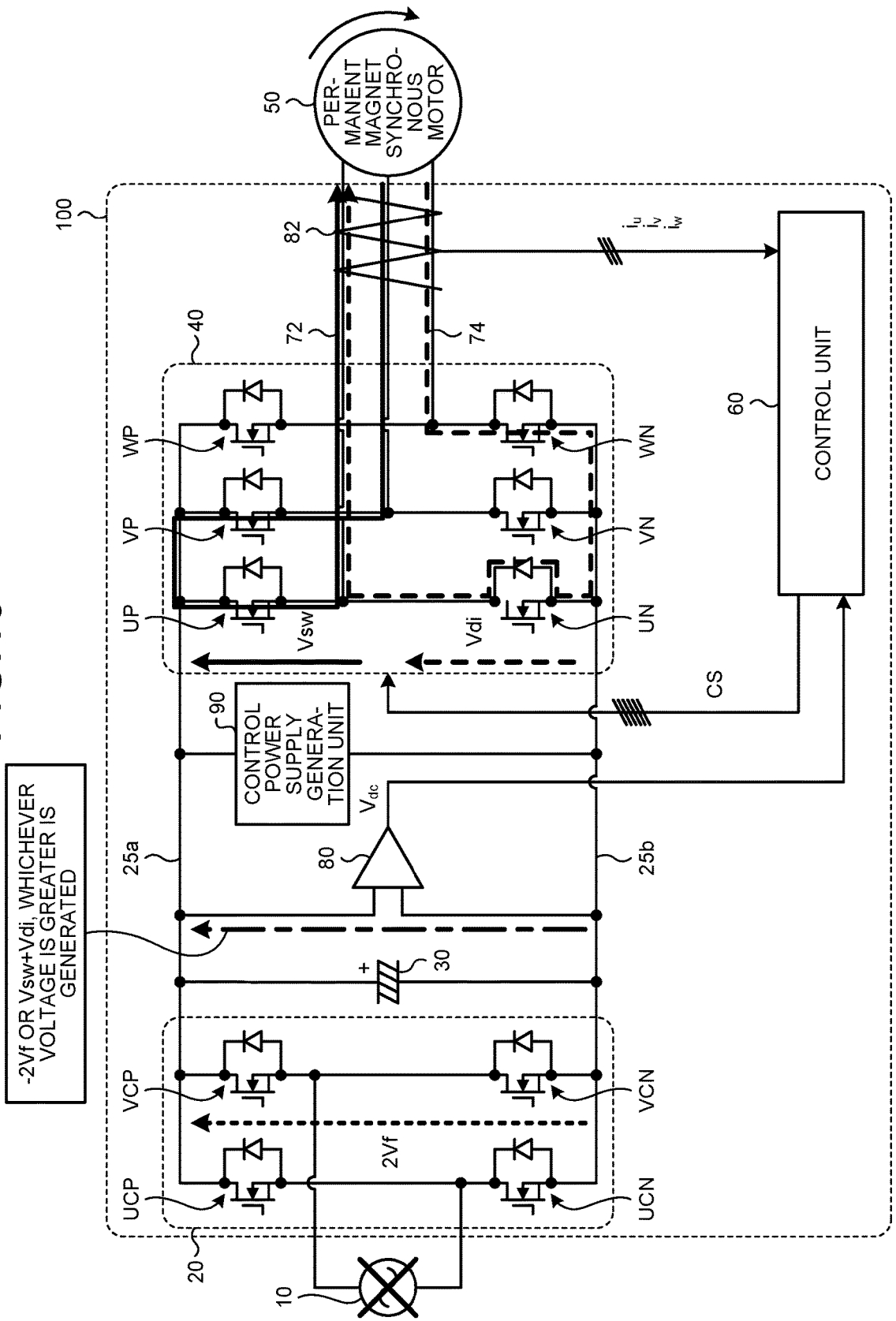
FIG. 10 is a diagram used for describing a mechanism of occurrence of a negative voltage, which is considered problematic in the first embodiment.

A mechanism of occurrence of a negative voltage will next be described with reference to FIG. 10. FIG. 10 is a diagram used for describing a mechanism of occurrence of a negative voltage, which is considered problematic in the first embodiment.

In FIG. 10, in the event of a loss of power supply, the supply of power to the smoothing capacitor 30 is cut off, and thereby if power is supplied to the permanent magnet synchronous motor 50, the capacitor voltage is decreased. The permanent magnet synchronous motor 50 continues its rotation by inertia even in this state, and therefore a regenerative current flows therein via the inverter 40. Among various types of motors, a permanent magnet synchronous motor continues to constantly generate an induced voltage to the motor terminals even without being supplied with power from the outside as long as the rotor rotates, due to the action of magnetic flux of a permanent magnet incorporated in the rotor.

FIG. 10 illustrates a state in which the MOSFET of the upper-arm switching element UP of the U phase, the MOSFET of the upper-arm switching element VP of the V phase, and the MOSFET of the lower-arm switching element WN of the W phase are turned on. In this case, a first current 72 represented by the solid line in FIG. 10 and a second current 74 represented by the broken line flow. The first current 72 a current flowing from the permanent magnet synchronous motor 50 sequentially through the MOSFET of the upper-arm switching element VP and the MOSFET of the upper-arm switching element UP and returning to the permanent magnet synchronous motor 50. In addition, the second current 74 is a current flowing through a different path from the path of the first current 72, which is a current flowing from the permanent magnet synchronous motor 50 sequentially through the MOSFET of the lower-arm switching element WN and the diode of the lower-arm switching element UN and returning to the permanent magnet synchronous motor 50.

The first current 72 is a current flowing from the drain to the source in the MOSFET of the upper-arm switching element UP. Thus, a voltage drop Vsw across the upper-arm switching element UP with reference to the source that is the first terminal thereof has a positive value. Note that the present embodiment assumes that a typical SiC-MOSFET is used, and that the forward voltage drop has a value of "0.1 V".

In addition, the second current 74 is a current flowing from the anode to the cathode in the diode of the lower-arm switching element UN. Thus, a voltage drop Vdi across the lower-arm switching element UN with reference to the source of the MOSFET that is a first terminal thereof has a negative value. Note that in the case of SiC, the voltage drop has a high value since a bandgap thereof is three times or more greater than Si. The present embodiment hereinafter assumes that the forward voltage drop of the diode in a typical SiC-MOSFET has a value of "4.0 V".

According to the foregoing operation, the inverter 40 generates a voltage of 0.1+(−4.0)=−3.9 V and applies this voltage between both ends of the smoothing capacitor 30. This may cause a negative voltage about −4 V to be generated between both ends of the smoothing capacitor 30 in each repetition of power cut.

Although the foregoing description has been directed to the voltage drop in the leg 40A consisting of the upper-arm switching element UP and the lower-arm switching element UN, a similar negative voltage also occurs in the leg 40B or 40C.

In addition, the foregoing description has been given for a point that the voltage drop Vsw occurring in the MOSFET of the upper-arm switching element UP and the voltage drop Vdi occurring in the diode of the lower-arm switching element UN cause the negative voltage to arise, but an opposite situation may occur. That is, the voltage drop Vdi occurring in the diode of the upper-arm switching element UP and the voltage drop Vsw occurring in the MOSFET of the lower-arm switching element UN may cause the negative voltage to arise.

A negative voltage caused by an operation of the rectification unit 20 when the AC power supply 10 is subjected to resumption of power will next be described.

In a situation where the AC power supply 10 is to be resumed, when the voltage of the AC power supply 10 has, for example, a positive polarity, the diode of the upper-arm element VCP and the diode of the lower-arm element UCN are electrically conducted, thereby a rectified voltage being applied between both ends of the smoothing capacitor 30. Alternatively, when the voltage of the AC power supply 10 has, for example, a negative polarity, the diode of the upper-arm element UCP and the diode of the lower-arm element VCN are electrically conducted, thereby a rectified voltage being applied between both ends of the smoothing capacitor 30. Accordingly, when the amount of the forward voltage drop across the diode is denoted by "Vf", the amount of the voltage drop in the entire rectification unit 20 is "2Vf".

Assume here that MOSFETs formed of a wide band gap semiconductor are used for the elements of the rectification unit 20. In this case, the amount of the voltage drop in the entire rectification unit 20 with reference to the DC bus line 25b on the lower potential side is −2Vf=−4.0+(−4.0)=−8.0 V. Accordingly, when the AC power supply 10 is resumed, the rectification unit 20 is not electrically conducted unless the AC power supply 10 provides a voltage of 8.0 V or higher. This means that a rotation operation of the permanent magnet synchronous motor 50 at the time of loss of power may generate a negative voltage up to about −8 V between both ends of the smoothing capacitor 30.

Note that even if, for example, Si-MOSFETs formed of silicon are used for the elements of the rectification unit 20, a voltage drop caused by the parasitic diode of the Si-MOSFET amounts about 2 V. Thus, the applied voltage not clamped unless the voltage exceeds 4 V that corresponds to two parasitic diodes. This may cause a negative voltage about −4 V to arise between both ends of the smoothing capacitor 30. This value is very high as compared to 1 V that is the amount of the voltage drop across a rectification diode generally used in the rectification unit 20. That is, in the configuration using MOSFETs in the rectification unit 20, there is a problem in that susceptibility to the negative voltage becomes higher because the negative voltage of about 4 V generated by the inverter 40 employing a wide bandgap semiconductor is not clamped.

As described above, there is a possibility that a voltage arises between both ends of the smoothing capacitor 30, the voltage being either the amount of the voltage drop in the entire rectification unit 20 (−2Vf) or the sum (Vsw+Vdi) of a first voltage (Vsw or Vdi) and a second voltage (Vdi or Vsw), whichever is greater. The first voltage is the potential difference between the second terminal and the first terminal of the upper-arm switching element in one of the legs of the inverter 40. The second voltage is the potential difference between the second terminal and the first terminal of the lower-arm switching element of that leg.

Figure 11:
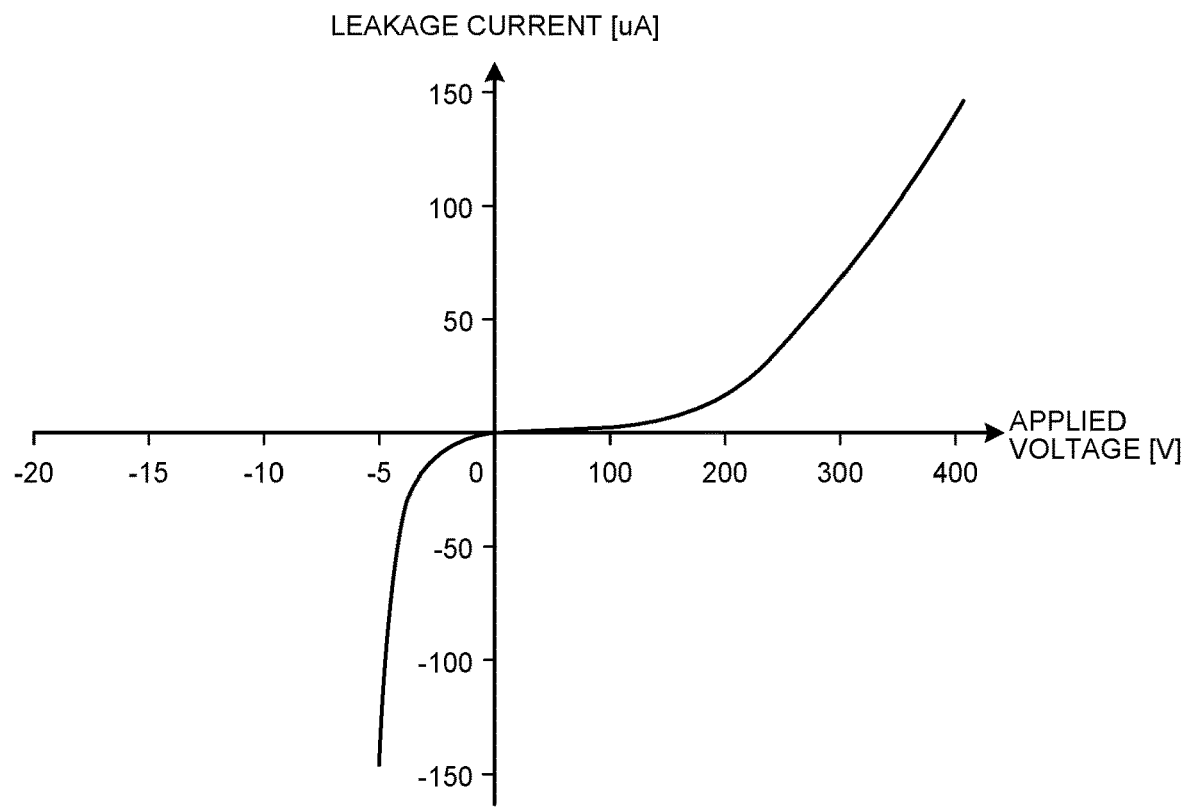
FIG. 11 is a graph for describing an influence on a smoothing capacitor illustrated in FIG. 1 when a negative voltage is generated.

FIG. 11 is a graph for describing an influence on the smoothing capacitor 30 illustrated in FIG. 1 in the case of occurrence of a negative voltage. Note that the smoothing capacitor 30 is assumed to be an electrolytic capacitor. In FIG. 11, the horizontal axis represents the applied voltage to the electrolytic capacitor, and the vertical axis represents the leakage current flowing in the electrolytic capacitor. As illustrated in FIG. 11, an excessive leakage current may be generated even when a relatively low negative voltage is applied. Occurrence of an excessive leakage current causes an increase in the temperature inside the electrolytic capacitor. Repeated temperature increase of the electrolytic capacitor may shorten the life of the electrolytic capacitor.

Figure 12:
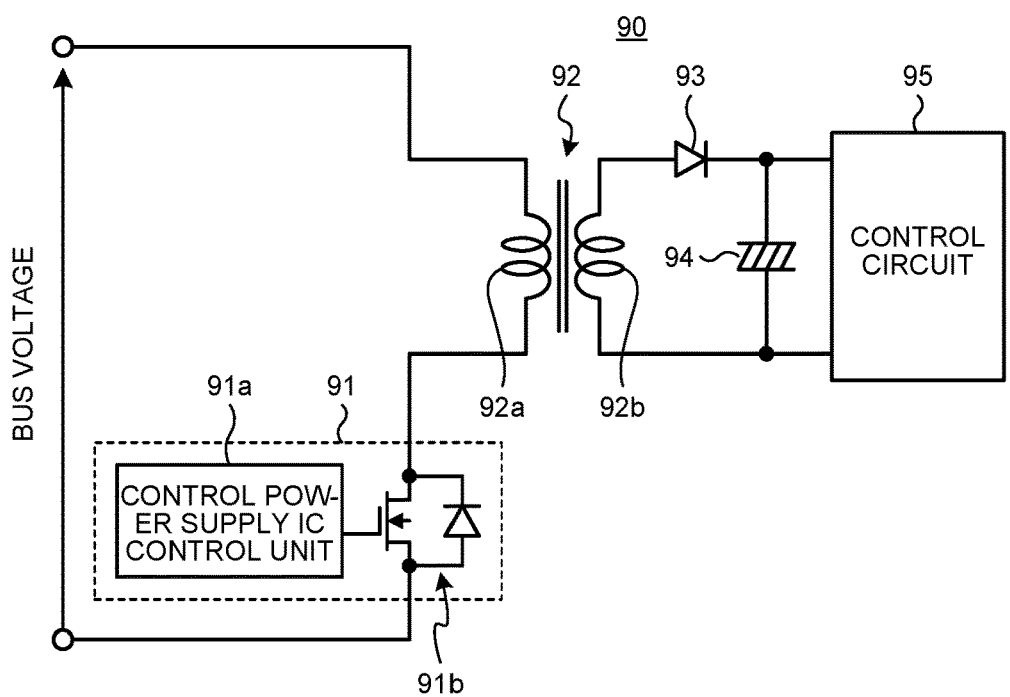
FIG. 12 is a diagram for describing an influence on a control power supply generation unfit illustrated in FIG. 1 when a negative voltage is generated.

FIG. 12 is a diagram for describing an influence on the control power supply generation unit 90 illustrated in FIG. 1 in the case of occurrence of a negative voltage. FIG. 12 illustrates a typical circuit configuration of the control power supply generation unit 90. As illustrated in FIG. 12, a typical control power supply generation unit 90 includes a control power supply IC 91, a transformer 92, a diode 93 for backflow prevention, a capacitor 94 for smoothing, and a control circuit 95 to which a power supply voltage is applied. In addition, the control power supply IC 91 includes a control power supply IC control unit 91a and a MOSFET 91b. A primary winding 92a of the transformer 92 and the MOSFET 91b are connected in series with each other. The bus voltage is applied between both ends of a series connection of the primary winding 92a and the MOSFET 91b. Then, the stepped-down voltage induced in a secondary winding 92b of the transformer 92 is applied to the capacitor 94.

When the bus voltage is a negative voltage, a positive voltage is applied to the anode of the parasitic diode formed in the MOSFET 91b. In this situation, the parasitic diode of the MOSFET 91b is conducted upon occurrence of the negative voltage about −4 V described above. In a case in which the control power supply IC 91 is formed of a single-chip semiconductor device, conduction of electricity through the parasitic diode may cause the parasitic transistor (not illustrated) formed inside the control power supply IC 91 to malfunction. Malfunction of the parasitic transistor of the control power supply IC 91 may result in failure to generate the power supply voltage, and in failure to apply the power supply voltage to the control unit 60, thereby making it impossible to drive the permanent magnet synchronous motor 50.

In the circumstances, the control unit 60 of the first embodiment performs the voltage drop prevention control described above. FIG. 13 is a flowchart used for describing an operation according to the voltage drop prevention control in the first embodiment. The process of the flowchart of FIG. 13 is invoked in the event of a loss of power. The voltage drop prevention control unit 67 performs the following control according to the flowchart of FIG. 13.

First of all, the comparator 66 compares the detected value $V_{dc}$ of the capacitor voltage with the threshold voltage $V_{th}$ (step S11). If the detected value $V_{dc}$ is less than or equal to the threshold voltage $V_{th}$ (Yes at step S11), the voltage drop prevention control unit 67 outputs the signal CS that is a stop signal (step S12).

One example of the stop signal is a zero vector. A zero vector corresponds to an output signal that causes the windings (not illustrated)) of the permanent magnet synchronous motor 50 to be electrically short-circuited. An example of the zero vector is a drive signal that turns on the lower-arm switching elements UN, VN, and WN, and turns off the upper-arm switching elements UP, VP, and WP. Another example of the zero vector is a drive signal that turns off the lower-arm switching elements UN, VN, and WN, and turns on the upper-arm switching elements UP, VP, and WP. Note that, instead of using a zero vector, outputting of the drive signal DS may be stopped.

Otherwise, if the detected value $V_{dc}$ exceeds the threshold voltage $V_{th}$ in the flow of FIG. 13 (No at step S11), the voltage drop prevention control unit 67 outputs the drive signal DS generated by the drive signal generation unit 66 as it is (step S13).

Note that, at step S11 described above, the case where the detected value $V_{dc}$ is equal to the threshold voltage $V_{th}$ is determined to be the "Yes" case, but it may be determined to be the "No" case. That is, if the detected value $V_{dc}$ is equal to the threshold voltage $V_{th}$, the process of step S13 may be performed.

FIG. 14 is a block diagram illustrating a configuration example of the voltage drop prevention control unit 67 in the first embodiment. FIG. 14 illustrates a configuration example in a case in which the voltage drop prevention control the first embodiment is carried out in hardware. The voltage drop prevention control unit 67 includes, as illustrated in FIG. 14, a comparator 68 and a stop signal generation unit 69.

Figure 15:
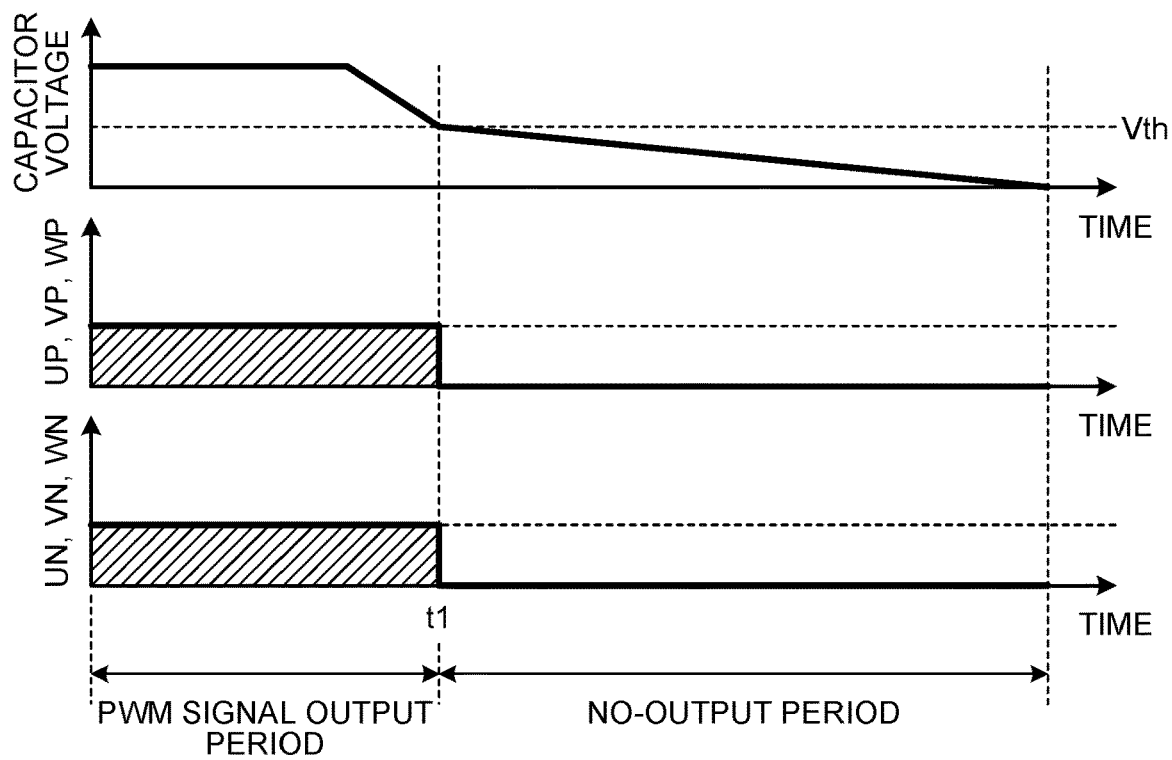
FIG. 15 is a first time chart used for describing a circuit operation of the voltage drop prevention control unit illustrated in FIG. 14.
Figure 16:
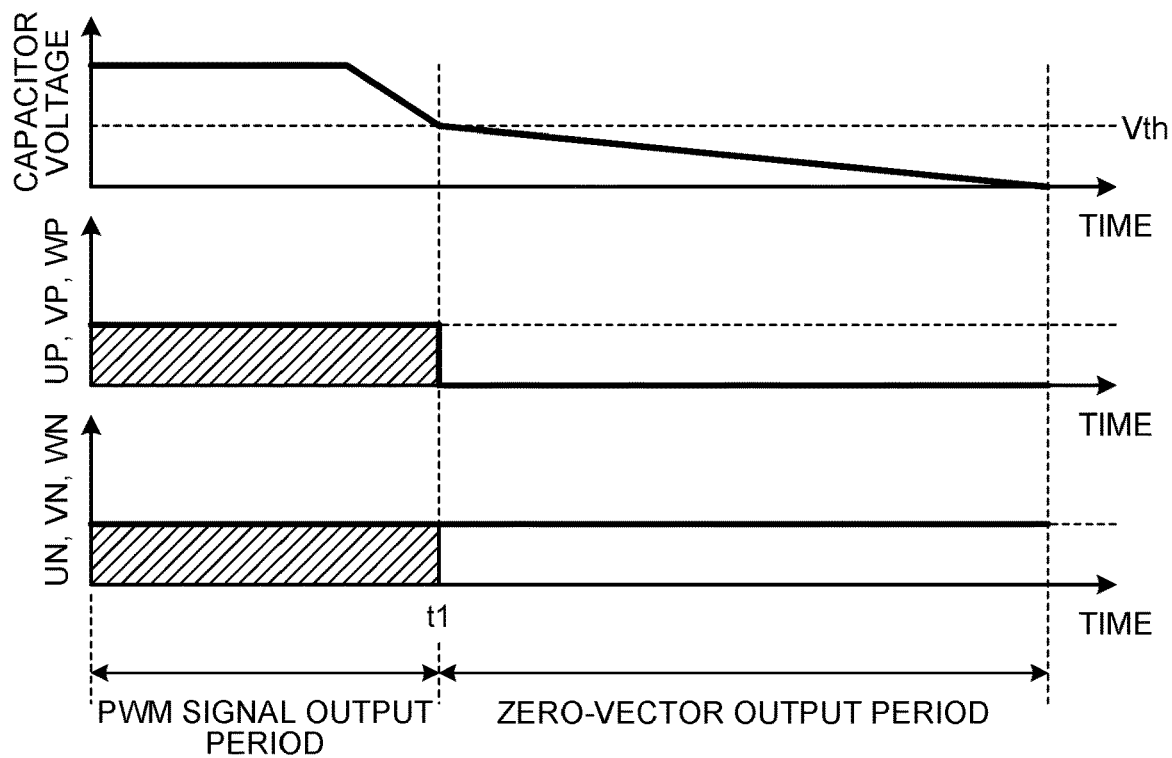
FIG. 16 is a second time chart used for describing a circuit operation of the voltage drop prevention control unit illustrated in FIG. 14.
Figure 17:
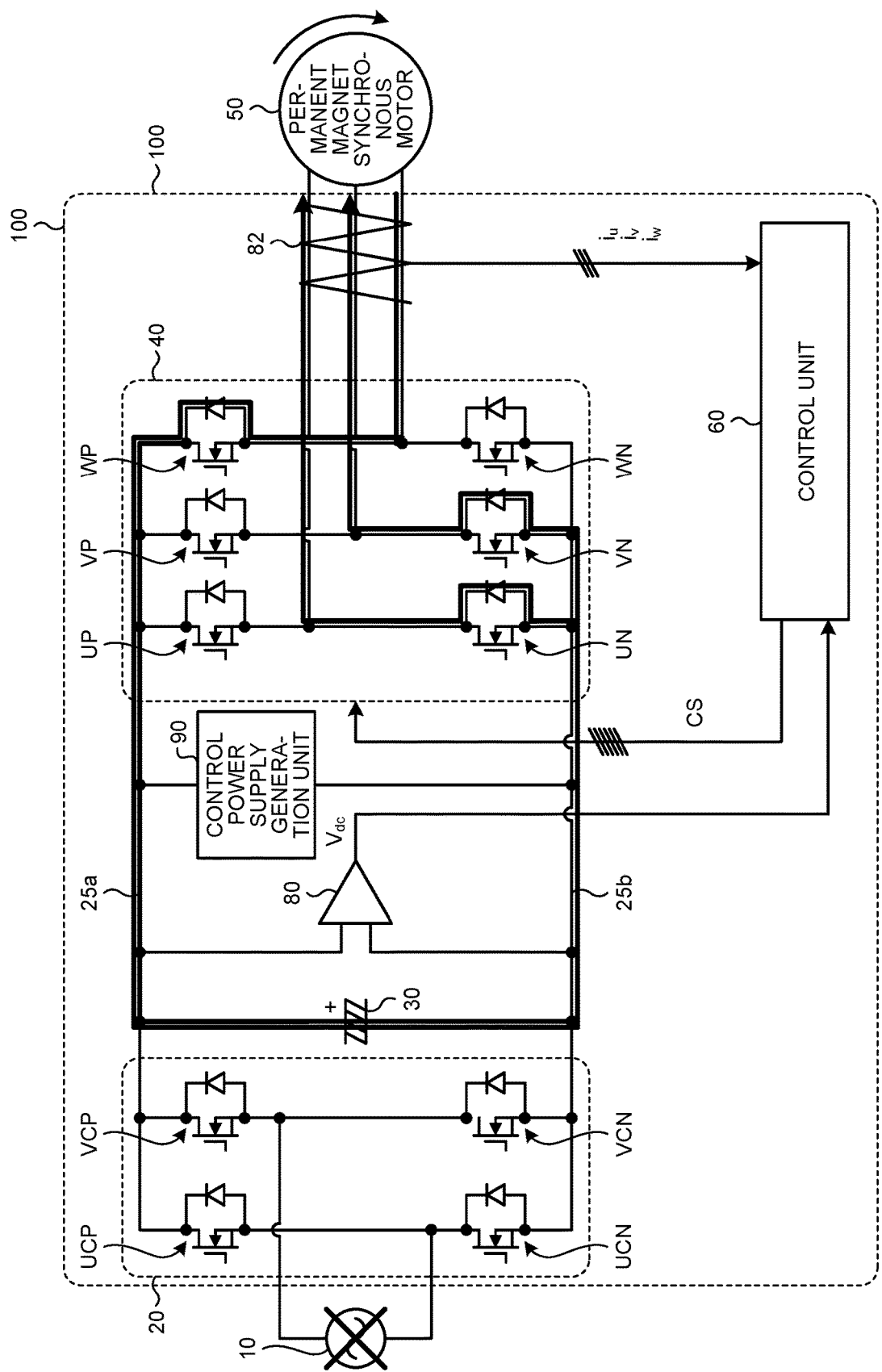
FIG. 17 is a diagram used for describing current paths when the voltage drop prevention control unit performs the operation illustrated in FIG. 15.
Figure 18:
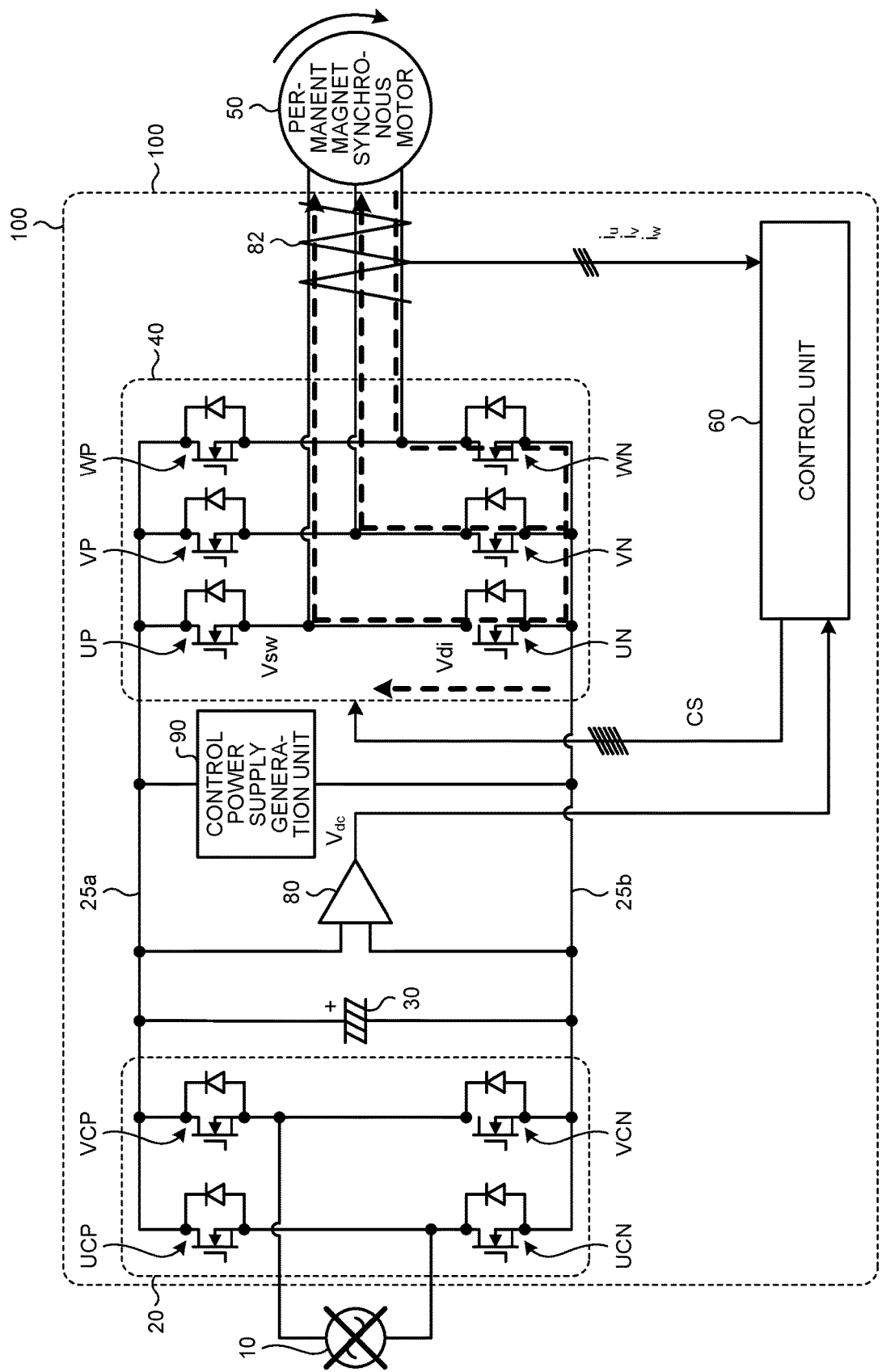
FIG. 18 is a diagram used for describing current paths when the voltage drop prevention control unit performs the operation illustrated in FIG. 16.

An operation of the voltage drop prevention control unit 67 illustrated in FIG. 14 will next be described with reference to the drawings of FIGS. 14 to 18. FIG. 15 is a first time chart illustrating an operation of the voltage drop prevention control unit 67 illustrated in FIG. 14. FIG. 16 is a second time chart illustrating an operation of the voltage drop prevention control unit 67 illustrated in FIG. 14. FIG. 17 is a diagram used for describing current paths when the voltage drop prevention control unit 67 performs the operation illustrated in FIG. 15. FIG. 18 is a diagram used for describing current paths when the voltage drop prevention control unit 67 performs the operation illustrated in FIG. 16.

In FIG. 14, the comparator 68 receives the detected value $V_{dc}$ of the capacitor voltage and the threshold voltage $V_{th}$. The comparator 68 outputs a detection signal Sp when the detected value $V_{dc}$ is less than or equal to the threshold voltage $V_{th}$. When the detection signal Sp is inputted, the stop signal generation unit 69 outputs, as the signal CS, the stop signal generated inside the stop signal generation unit 69. Alternatively, when no detection signal Sp is inputted, the stop signal generation unit 69 outputs the drive signal CS inputted, as the signal CS as it is.

Note that the above description is directed to a point that the detection signal Sp is outputted when the detected value $V_{dc}$ is less than or equal to the threshold voltage $V_{th}$, but the present invention is not limited to this example. Instead of this example, use may be made of a signal for outputting a "logical 1" when the detected value $V_{dc}$ is less than or equal to the threshold voltage $V_{th}$, and outputting a "logical 0" when the detected value $V_{dc}$ exceeds the threshold voltage $V_{th}$, for example.

FIGS. 15 and 16 each illustrate a situation in which the capacitor voltage drops and falls below the threshold voltage $V_{th}$ t time t1.

In FIG. 15, the hatched section until time t1 is a PWM signal output period, and the section after time t1 is a no-output period. During the PWM signal output period, the drive signal DS causes any of the upper-arm switching elements UP, VP, and WP and the lower-arm switching elements UN, VN, and WN to be in operation. In contrast, during the no-output period, none of the upper-arm switching elements UP, VP, and WP and the lower-arm switching elements UN, VN, and WN have their switching operations stopped.

In addition, in FIG. 16, the hatched section until time t1 is a PWM signal output period, and the section after time t1 is a zero-vector output period. During the PWM signal output period, the drive signal DS causes any of the upper-arm switching elements UP, VP, and WP and the lower-arm switching elements UN, VN, and WN to be in operation. In contrast, during the zero-vector output period, the upper-arm switching elements UP, VP, and WP are in off operation, and the lower-arm switching elements UN, VN, and WN are in on operation.

FIG. 17 illustrates an example of current paths when the voltage drop prevention control unit 67 performs the operation illustrated in FIG. 15. As illustrated in FIG. 17, one of the currents flowing from the W-phase winding (not illustrated) of the permanent magnet synchronous motor 50 flows sequentially through the diode of the upper-arm switching element WP, the smoothing capacitor 30, and the diode of the lower-arm switching element UN and returns to the permanent magnet synchronous motor 50. In addition, another one of the currents flowing from the W-phase winding (not illustrated) of the permanent magnet synchronous motor 50 flows sequentially through the MOSFET of the upper-arm switching element WP, the smoothing capacitor 30, and the diode of the lower-arm switching element VN and returns to the permanent magnet synchronous motor 50. Both of these currents are currents that charge the smoothing capacitor 30 to a positive voltage. Thus, by the voltage drop prevention control unit 67 performing the voltage drop prevention control illustrated in FIG. 15, it is possible to reliably prevent the smoothing capacitor 30 from undergoing a negative voltage.

FIG. 18 illustrates an example of current paths when the voltage drop prevention control unit 67 performs the operation illustrated in FIG. 16. As illustrated in FIG. 18, one of the currents flowing from the W-phase winding (not illustrated) of the permanent magnet synchronous motor 50 flows sequentially through the MOSFET of the lower-arm switching element WN and the MOSFET of the lower-arm switching element UN and returns to the permanent magnet synchronous motor 50. In addition, another one of the currents flowing from the W-phase winding (not illustrated) of the permanent magnet synchronous motor 50 flows sequentially through the MOSFET of the lower-arm switching element WN and the MOSFET of the lower-arm switching element VN and returns to the permanent magnet synchronous motor 50. When these currents flow, the second voltage Vdi due to the forward voltage drop component is generated in the MOSFET of the lower-arm switching element UN and the MOSFET of the lower-arm switching element VN. However, the second voltage Vdi generated in each of the MOSFETs of the lower-arm switching element UN and the lower-arm switching element VN is electrically separated from the smoothing capacitor 30, and therefore does not affect the voltage across the smoothing capacitor 30.

Note that an example of FIG. 16 illustrates that in the zero-vector output period, the upper-arm switching elements UP, VP, and WP are turned off and the lower-arm switching elements UN, VN, and WN are turned on, but the operations of the upper-arm switching elements UP, VP, and WP and the operations of the lower-arm switching elements UN, VN, and WN may be made in opposite on/off pattern to the example. That is, in the zero-vector output period, it is possible that the upper-arm switching elements UP, VP, and WP are turned on and the lower-arm switching elements UN, VN, and WN are turned off.

Note that it is sufficient that the threshold voltage $V_{th}$ be set to a voltage value that does not cause the smoothing capacitor 30 to have a negative voltage, and any such value may be set as the threshold voltage $V_{th}$. Nevertheless, a suitable value is preferably set as the threshold voltage $V_{th}$ in consideration of the means for detecting the loss of power. For example, when the AC power supply is a utility power supply at 50 Hz, one cycle as the power supply cycle is 20 ms. For example, in a case in which the means for detecting the loss of power is of a type that operates to detect a zero crossing point in the power supply cycle, detection of loss of power may be delayed, before which a drive signal based on the power running control may be applied. For this reason, it is necessary that the threshold voltage $V_{th}$ be set taking into consideration the delay time of detection of loss of power and/or the like. It is therefore important that the threshold voltage $V_{th}$ be set to cause the power running control to be stopped in the state in which the voltage across the smoothing capacitor is higher than the sum (Vsw+Vdi) of the first voltage (Vsw) and the second voltage (Vdi). Note that the first voltage (Vsw) is a voltage generated across the upper-arm switching element of one of the legs, and the second voltage (Vdi) is a voltage generated across the lower-arm switching element of the same lag as the leg in which the first voltage (Vsw) is generated.

As described above, the load driving device 100 according to the first embodiment stops performing the power running control in the state in which the voltage across the smoothing capacitor 30 is higher than the sum (Vsw+Vdi) of the first voltage (Vsw) and the second voltage (Vdi), and can therefore reliably prevent the voltage across the smoothing capacitor from becoming a negative voltage without including an additional component.

Note that, as described above, a negative voltage of the smoothing capacitor is noticeable when a switching element of the rectification unit 20 or a switching element of the inverter 40 is formed of a wide bandgap semiconductor. Therefore, the voltage drop prevention control in the first embodiment is particularly advantageous in a case in which a switching element of the rectification unit 20 or the inverter 40 is formed of a wide bandgap semiconductor.

Second Embodiment

FIG. 19 is a circuit diagram illustrating a configuration example of a load driving device 100A according to a second embodiment. The load driving device 100A illustrated in FIG. 19 has a configuration based on an assumption that it is used as an outdoor unit of an air conditioner. Specifically, it is assumed herein that a permanent magnet synchronous motor 50 is applied to a compressor motor and a second permanent magnet synchronous motor 55 is applied to a fan motor.

The load driving device 100A according to the second embodiment illustrated in FIG. 19 further includes, in addition to the configuration of the load driving device 100 according to the first embodiment illustrated in FIG. 1, a second inverter 45 that supplies AC power to the second permanent magnet synchronous motor 55, and a second current detector 84 that detects a second motor current flowing between the second inverter 45 and the second permanent magnet synchronous motor 55. DC terminals of the second inverter 45 are connected to the DC bus lines 25a and 25b. Accordingly, shown is a configuration that the DC voltage across the smoothing capacitor 30 is applied to the inverter 40 and to the second inverter 45 via the shared DC bus lines 25a and 25b. The second current detector 84 detects a motor current, and detected values $i_{uf}$, $i_{vf}$, and $i_{wf}$ of the detected motor current are inputted to the control unit 60. The control unit 60 generates signals CS2 for either operating or stopping the second inverter 45 based on the detected value $V_{dc}$ of the capacitor voltage and the detected values $i_{uf}$, $i_{vf}$, and $i_{wf}$ of the second motor current, and outputs the signals CS2 to the second inverter 45. Note that the other components are identical or equivalent to the corresponding components of the first embodiment illustrated in FIG. 1. The identical or equivalent components are designated by the same reference characters, and redundant description will be omitted.

In an air conditioner, the compressor motor consumes several hundreds watts to several kilowatts of electrical power, whereas the fan motor consumes at most several tens watts to a hundred watts of electrical power. That is, the compressor motor consumes a larger amount of electrical power than the fan motor. For this reason, when loss of power arises, a prolonged rotation operation of the compressor motor is more likely to cause a rapid drop of the voltage across the smoothing capacitor 30 to thereby generate the negative voltage described in the first embodiment. Therefore, a preferred embodiment is in line with a manner that the compressor motor is preferentially stopped before the fan motor. Such stopping of the compressor motor before stopping of the fan motor can reliably prevent occurrence of a negative voltage.

In addition, the fan motor has a larger moment of inertia than the compressor motor. For this reason, the fan motor has a characteristic of continuing its rotation for a long period of time even after the voltage application to the inverter 40 and to the second inverter 45 is interrupted. Thus, even when the compressor motor is antecedently stopped before the fan motor, the fan motor continues its rotation and heat exchange, thereby enabling prevention of a pressure increase in the refrigeration cycle relying on which the air conditioner is configured, and thus enabling the air conditioner to be stopped more safely. As described above, the voltage drop prevention control to stop the compressor motor antecedent to the fan motor contributes to enhancing the effectiveness of the control to safely stop the air conditioner, and thereby leads to a more preferred embodiment for an air conditioner.

Note that the configurations described is the foregoing embodiments are merely examples of a concept of the present invention, and so can each be combined with other publicly known techniques and partially omitted and/or modified without departing from the scope of the present invention.

The invention claimed is:

1. A load driving device supplying alternating-current power to first and second permanent magnet synchronous motors and driving a load including the first and second permanent magnet synchronous motors, the load driving device comprising:
a smoothing capacitor;
first and second inverters each having at least two legs, each of the legs having an upper-arm switching element and a lower-arm switching element connected in series with each other, each of the inverters converting direct-current power stored in the smoothing capacitor into the alternating-current power; and
a control unit controlling the first and second inverters, wherein
the first inverter drives a first load including the first permanent magnet synchronous motor,
the second inverter drives a second load including the second permanent magnet synchronous motor,
the second load has a moment of inertia higher than a moment of inertia of the first load,
the control unit
performs voltage drop prevention control to stop power running control on the first and second loads in a state in which the voltage across the smoothing capacitor is higher than a sum of a first voltage and a second voltage, the first voltage being an electrical potential difference between a second terminal of the upper-arm switching element and a first terminal of the upper-arm switching element with reference to the first terminal of the upper-arm switching element, the second voltage being an electrical potential difference between a second terminal of the lower-arm switching element and a first terminal of the lower-arm switching element with reference to the first terminal of the lower-arm switching element in the same leg as a leg of the upper-arm switching element,
stops the power running control on the first and second loads when the voltage across the smoothing capacitor is lower than a threshold voltage, and
stops rotation of the first permanent magnet synchronous motor before the second permanent magnet synchronous motor.

2. The load driving device according to claim 1, wherein the first voltage is a voltage drop caused by a current flowing in a parasitic diode of the upper-arm switching element or a voltage drop caused by a current flowing in a diode connected in parallel with the upper-arm switching element, and
the second voltage is a voltage drop caused by a current flowing in a transistor of the lower-arm switching element in the same leg as a leg of the upper-arm switching element.

3. The load driving device according to claim 1, wherein the first voltage is a voltage drop caused by a current flowing in a transistor of the upper-arm switching element, and
the second voltage is a voltage drop caused by a current flowing in a parasitic diode of the lower-arm switching element or a voltage drop caused by a current flowing in a diode connected in parallel with the lower-arm switching element, in the same leg as a leg of the upper-arm switching element.

4. The load driving device according to claim 1, wherein switching elements constituting an inverter that is at least one of the first and second inverters are metal-oxide semiconductor field-effect transistors, and at least one of the metal-oxide semiconductor field-effect transistors is formed of a wide bandgap semiconductor.

5. The load driving device according to claim 1, comprising:
a rectification unit converting an alternating-current voltage outputted from an alternating-current power supply into a direct-current voltage and applying the direct-current voltage to the smoothing capacitor, wherein
the rectification unit has two or more legs, an upper-arm element and a lower-arm element of each of which are connected in series with each other, and the upper-arm element of each of the legs is configured by a switching element or the lower-arm element of each of the legs is configured by a switching element, or the upper-arm element and the lower-arm element of at least one of the legs are each configured by a switching element.

6. The load driving device according to claim 5, wherein at least one of switching elements constituting the rectification unit is formed of a wide bandgap semi conductor.

7. A refrigeration cycle applicable apparatus equipped with the load driving device according to claim 1.

8. An air conditioner in which the refrigeration cycle applicable apparatus according to claim 7 is set, wherein
the first permanent magnet synchronous motor drives a compressor, and
the second permanent magnet synchronous motor drives a blower.

* * * * *